United States Patent
Polonsky et al.

(10) Patent No.: US 8,160,355 B1
(45) Date of Patent: Apr. 17, 2012

(54) METHOD, DEVICE AND COMPUTER PROGRAM PRODUCT FOR PERFORMING WHITE BALANCING OF A DIGITAL IMAGE

(75) Inventors: Shlomo Polonsky, Modi'in (IL); Andrey Tovchigrechko, Moscow (RU)

(73) Assignee: Pixim Israel Ltd., Ra'anana, IL (US)

( * ) Notice: Subject to any disclaimer, the term of this patent is extended or adjusted under 35 U.S.C. 154(b) by 973 days.

(21) Appl. No.: 12/122,697

(22) Filed: May 18, 2008

(51) Int. Cl.
*G06K 9/00* (2006.01)
(52) U.S. Cl. .......................... 382/167; 382/162; 382/274
(58) Field of Classification Search .................. 382/167, 382/100, 106, 274; 375/240.25, E7.093; 348/222.1, 224.1, 370, E9.01
See application file for complete search history.

(56) References Cited

U.S. PATENT DOCUMENTS 7,457,477 B2 * 11/2008 Petschnigg et al. ........... 382/274
7,920,172 B2 * 4/2011 Chanas et al. ............. 348/222.1

FOREIGN PATENT DOCUMENTS

JP 02006270135 A * 10/2006
* cited by examiner

*Primary Examiner* — Anh Hong Do
(74) *Attorney, Agent, or Firm* — Reches Patents

(57) ABSTRACT

A method for performing white balancing of a digital image, the method includes: generating or receiving multiple candidates, each candidate represents a pixel area of the digital image; applying multiple white balancing estimation processes on the candidates to provide multiple digital image imbalance estimations; wherein a first white balancing estimation process differs from a second white balancing estimation process by its inherent reliability; calculating at least one white balancing compensation parameter in response to at least two digital image imbalance estimations; and providing a compensated digital image by applying at least one white balancing compensation image.

25 Claims, 19 Drawing Sheets

METHOD, DEVICE AND COMPUTER PROGRAM PRODUCT FOR PERFORMING WHITE BALANCING OF A DIGITAL IMAGE

RELATED APPLICATION

This application incorporates by reference US patent application titled "Method, device and computer program product for performing a color based white balance of a digital image" and US application titled "Method, device and computer program product for performing a gamut based white balance of a digital image", all being concurrently filed in the United States of America.

BACKGROUND OF THE INVENTION

1. Field of the Invention

The invention relates to the field of digital color image processing and especially to white balancing of a digital image.

2. Description of the Prior Art

The human eye can adjust to varying illumination conditions. Digital images should undergo a compensation process that is known as white balancing in order to adjust digital images to varying illumination conditions. This process is referred to as white balancing because its goal is to represent white objects as white, despite the illumination conditions.

Some prior art white balancing methods are highly complex and require computational resources that are available only in costly hardware, other prior art methods process the whole digital image and are time consuming. Various prior art methods and systems for white balancing are described in the following patents and patent applications, all being incorporated herein by reference: U.S. Pat. No. 7,151,563 of Masayu, U.S. Pat. No. 6,873,727 of Lopez et al., U.S. Pat. No. 7,006,135 of Ishimaru et al., and U.S. Pat. No. 6,839,088 of Dicarlo et al.

Different prior art methods are suited for different scenarios. One method can provide adequate results when applied on a certain image but is not able to provide adequate results when applied on another image.

There is a growing need to provide a robust and reliable white balancing method, device, and computer program product.

SUMMARY OF THE INVENTION

A method for performing white balancing of a digital image, the method includes: generating or receiving multiple candidates, each candidate represents a pixel area of the digital image; applying multiple white balancing estimation processes on the candidates to provide multiple digital image imbalance estimations; wherein a first white balancing estimation process differs from a second white balancing estimation process by its inherent reliability; calculating at least one white balancing compensation parameter in response to at least two digital image imbalance estimations; and providing a compensated digital image by applying at least one white balancing compensation image.

A device having color gamut based white balancing capabilities, the device includes a processor and a memory unit; wherein the memory unit stores the digital picture and multiple candidates, each candidate represents a pixel area of the digital image; wherein the processor is adapted to: apply multiple white balancing estimation processes to provide multiple digital image imbalance estimations; wherein a first white balancing estimation process differs from a second white balancing estimation process by its inherent reliability; calculate at least one white balancing compensation parameter in response to at least two digital image imbalance estimations; and provide a compensated digital image by applying at least one white balancing compensation image.

A computer program product that comprises a tangible computer readable medium that stores code that once executed by a computer, causes the computer to: generate or receive multiple candidates, each candidate represents a pixel area of the digital image; apply multiple white balancing estimation processes to provide multiple digital image imbalance estimations; wherein a first white balancing estimation process differs from a second white balancing estimation process by its inherent reliability; calculate at least one white balancing compensation parameter in response to at least two digital image imbalance estimations; and provide a compensated digital image by applying at least one white balancing compensation image.

DETAILED DESCRIPTION OF THE DRAWINGS

A white balancing method, device and computer program product are provided. Multiple white balancing estimation processes are applied on candidates to provide multiple digital image imbalance estimations. At least one digital image imbalance estimation is processed in order to determine one or more white balancing compensation parameters.

Different white balancing estimation processes can be characterized by different reliabilities and can be suited to different images.

Multiple areas of digital pixels are represented by candidates that have a pair of chromaticity values calculated from the color information of these areas of pixels. A selection process selects candidates that have chromaticity values located within any of these color gamuts.

A candidate is an information unit that represents color information of a pixel area. It has a pair of chromaticity values. It is termed candidate because is can affect the white balancing process or can be ignored.

After the selection process ends, at least one white balance compensation parameter is calculated in response to selected candidates.

At least one white balance compensation parameter can be used to provide a compensated digital image.

Candidates that have their chromaticity values proximate to a color gamut but outside the color gamut can also be taken into account, thereby resulting in a further increment of the number of "relevant" candidates.

Conveniently, the white balancing is further simplified by generating chromaticity values within a chromaticity space in which a black body line is horizontal.

Figure 4:
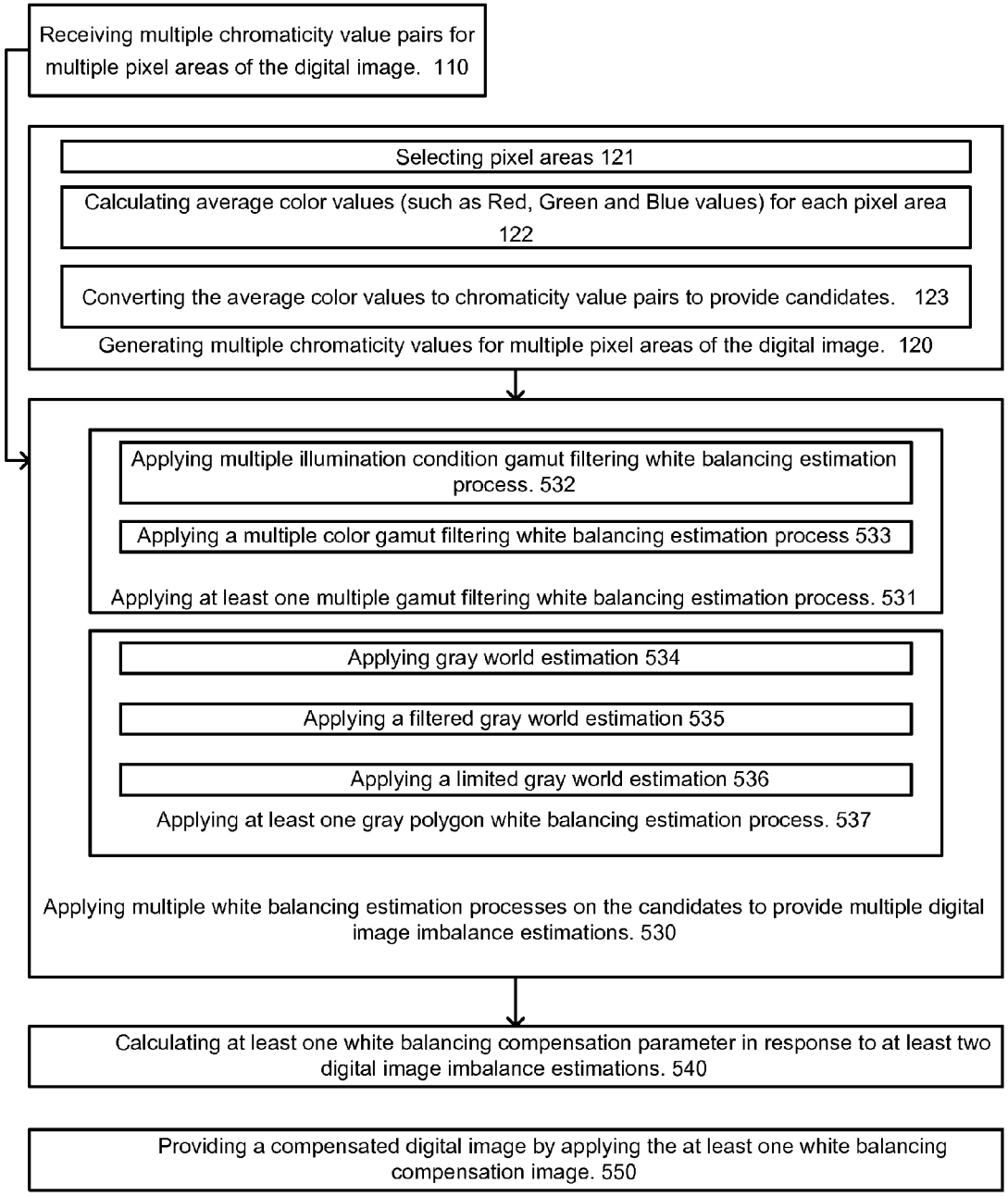
FIG. 4 is a flow chart of a method according to an embodiment of the invention.

FIG. 4 illustrates method 500 according to an embodiment of the invention.

Method 100 starts by stage 110 or 120.

Stage 110 includes receiving multiple chromaticity value pairs for multiple pixel areas of the digital image. Stage 110 includes receiving multiple candidates.

Stage 120 includes generating multiple chromaticity values for multiple pixel areas of the digital image. Stage 120 includes generating candidates.

Stage 120 can include at least one of the following stages or a combination thereof: (i) stage 121 of selecting pixel areas; (ii) stage 122 of calculating average color values (such as Red, Green and Blue values) for each pixel area; and (iii) stage 123 of converting the average color values to chromaticity value pairs to provide candidates. The chromaticity values of the candidates can be within a chromaticity space in which a black body line is horizontal but this is not necessarily so.

Figure 1:
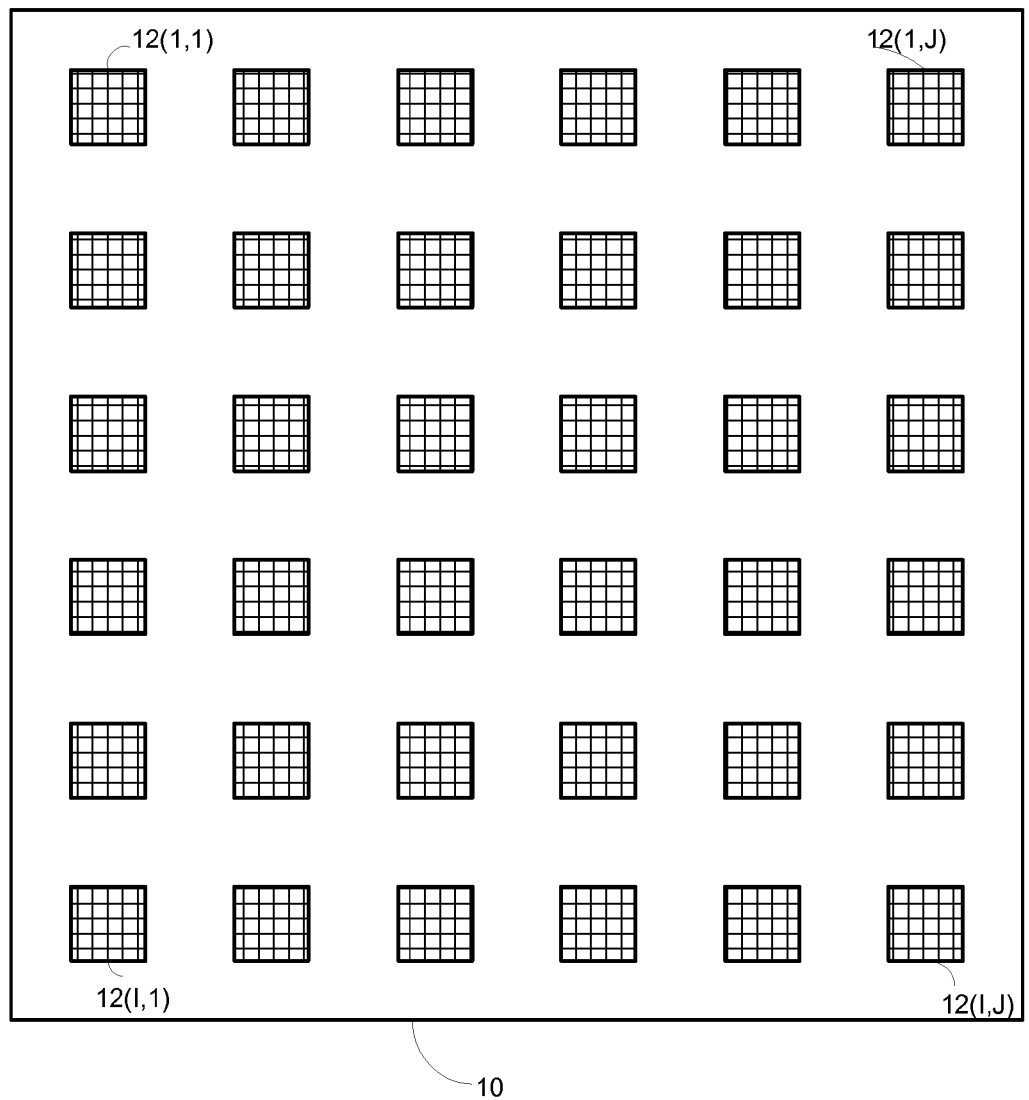
FIG. 1 illustrates a digital image and multiple pixel areas according to an embodiment of the invention.

FIG. 1 illustrates digital image 10 and multiple pixel areas 12(1,1)-12(I,J) according to an embodiment of the invention.

Indices I and J are positive integers. FIG. 1 is out of scale and the pixels within all the pixel areas can be only a small fraction of the overall pixels of digital image 10. A pixel area and the number of pixel areas can be relatively small. For example, the number of pixel areas can be 8×8, 10×10, 16×12, 20×20, and the like, and the number of pixels per pixel area can include, for example, 2×2, 4×4, 8×8, 10×10 pixels and the like.

The pixel areas can be a square shape but this is not necessarily so. The pixel areas can spread in a homogenous manner but this is not necessarily so. For example, pixel areas can be spread over the complete digital image or mostly located in one or more portions (for example a central portion) of digital image 10.

Each pixel area (for example 12(i,j)) is represented by a pair of chromaticity values x'(i,j) and y'(i,j). These chromaticity values can be calculated by: (i) calculating, for that pixel area, average colors values R(i,j), B(i,j), G(i,j), wherein these average color values can be arithmetic mean, geometric mean, weighted averages and the like; (ii) converting these average color values to a pair of chromaticity values x' and y':

$$x'(i,j) = x(i,j) \cdot \cos \alpha + y(i,j) \cdot \sin \alpha,$$

$$y'(i,j) = -x(i,j) \cdot \sin \alpha + y(i,j) \cdot \cos \alpha,$$

Wherein:

$$x(i,j) = \frac{G(i,j) \cdot B(i,j)}{R(i,j) \cdot G(i,j) + G(i,j) \cdot B(i,j) + R(i,j) \cdot B(i,j)},$$

$$y(i,j) = \frac{G(i,j) \cdot R(i,j)}{R(i,j) \cdot G(i,j) + G(i,j) \cdot B(i,j) + R(i,j) \cdot B(i,j)},$$

and $\alpha$ is the angle between a black body line and an x-axis of an R/G, B/G space, before the black body line is rotated.

Figure 2A:
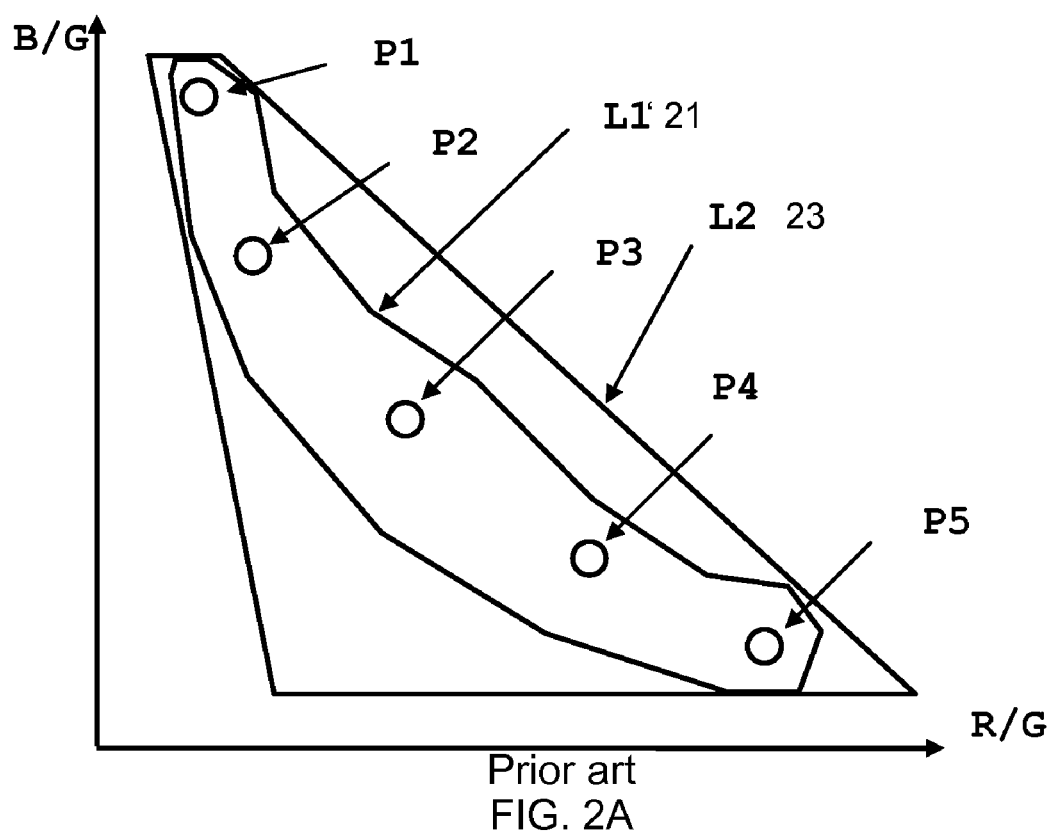
FIG. 2A illustrates a prior art (R/G, B/G) space and gray gamuts.

FIG. 2A illustrates a prior art (R/G, B/G) space in which L1' 21 is a gray polygon that is not linear. Its shape complicates the determination of whether a pair of R/G, B/G values is within the polygon or not. Due to this complexity it was suggested to replace L1' 21 by trapezoid L2 23. It is noted that trapezoid L2 23 is much larger than L1' 21 and using it results in significant inaccuracies.

Figure 2B:
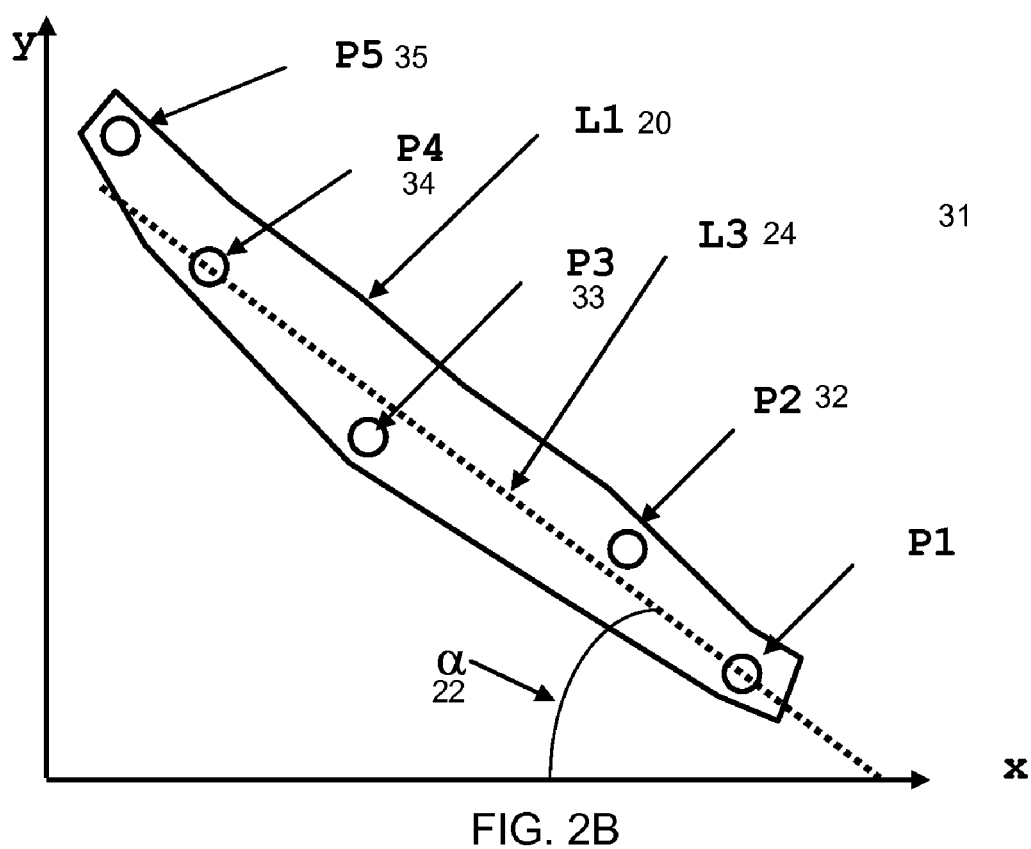
FIG. 2B illustrates an oriented gray gamut and a black body line, according to an embodiment of the invention.

FIG. 2B illustrates an oriented gray gamut L1 20 and a black body line L3 24 that is oriented at angle $\alpha$ 22 in relation to an x-axis of a chromaticity space (x,y), according to an embodiment of the invention.

The rotated chromaticity space has several advantages over the prior art (R/G, B/G) space: (i) The (R/G, B/G) space is very non-linear in a sense that black-body locus is close to hyperbola, and the gray candidates region has a half-moon shape (not-convex!). As a result, the calculations (whether the candidate is inside the region, distant to the region etc) are complex, or the simplified region is very inaccurate; (ii) the inverse space (G/R, G/B) is not uniform (the ends are stretched too much, because of the possibly small values in the denominator); (iii) the space of gains (x, y) where x=WR/(WR+WG+WB), y=WB/(WR+WG+WB) includes an oriented black body, which complicates geometric calculations, (iv) The rotated chromaticity space is close to linear, more uniform, allows usage of Euclidian geometry with better results, and as the gray region is a narrow band oriented horizontally, it simplifies calculations significantly.

Figure 3:
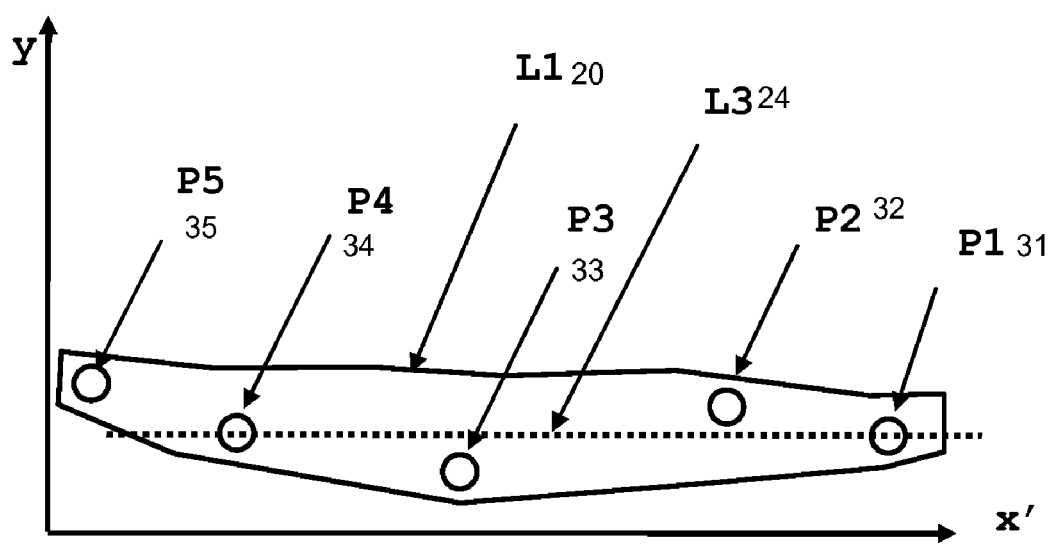
FIG. 3 illustrates multiple points, a gray gamut and a horizontal black body line after being rotated, according to an embodiment of the invention.

Points P1 31, P2 32, P3 33, P4 34, and P5 35 have chromaticity value pairs that correspond to a typical daylight gray point, a typical daylight or fluorescent illumination gray point, a typical cool white fluorescent illumination gray point, a typical incandescent illumination gray point, and a typical warm white fluorescent illumination gray point. FIG. 3 illustrates points P1-P5 31-35, gray gamut L1 20, and horizontal black body line L3 24 after being rotated by a 22, according to an embodiment of the invention.

Using a chromaticity space simplifies the calculation as even in an oriented format the gray polygons are more linear than the polygons of the R/G, B/G space. The rotation further simplifies the calculation of a spatial relationship between gray gamut L2 20 (and portions of that gamut that can be associated with different illumination conditions) and various chromaticity value pairs that of pixel areas. The same applies to non-gray color gamuts.

Figure 11:
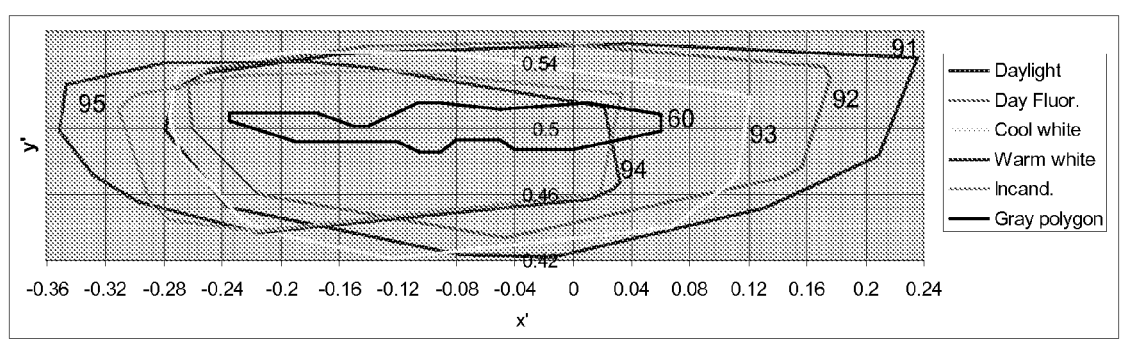
FIG. 11 illustrates multiple color gamuts and multiple candidates according to an embodiment of the invention.

FIG. 11 illustrates multiple color gamuts in the oriented chromaticity space of X' and Y'. It includes a daylight gamut 91, a day fluorescence gamut 92, a cool while illumination gamut 93, a warm light gamut 94, an incandescence gamut 95 and a gray polygon 60. These gamuts have overlapping areas and are substantially horizontal.

Stages 110 and 120 are followed by stage 530 of applying multiple white balancing estimation processes on the candidates to provide multiple digital image imbalance estimations. These multiple white balancing estimation processes can include at least two white balancing estimation processes that differ from each other by their inherent reliability.

Stage 530 can include applying at least one multiple gamut filtering white balancing estimation process (as indicated by box 531) and at least one gray polygon white balancing estimation process (indicated by box 537) selected out of a gray world estimation (box 534), a filtered gray world estimation (box 535) and a limited gray world estimation (box 536).

According to various embodiments of the invention at least two (or even three) gray polygon white balancing estimation processes are applied and in addition at least one multiple white balancing estimation processes are applied.

A gray polygon includes chromaticity values that can be attributed to a gray object. It is noted that any of the mentioned above gray polygon white balancing estimation processes can take into account candidates that have a chromaticity value that is outside the gray polygon but in proximity to the gray polygon.

Gray world estimation (box 534) can involve averaging chromaticity values of candidates that have their chromaticity value pairs within a gray polygon and to provide a digital image imbalance estimation.

Figure 5:
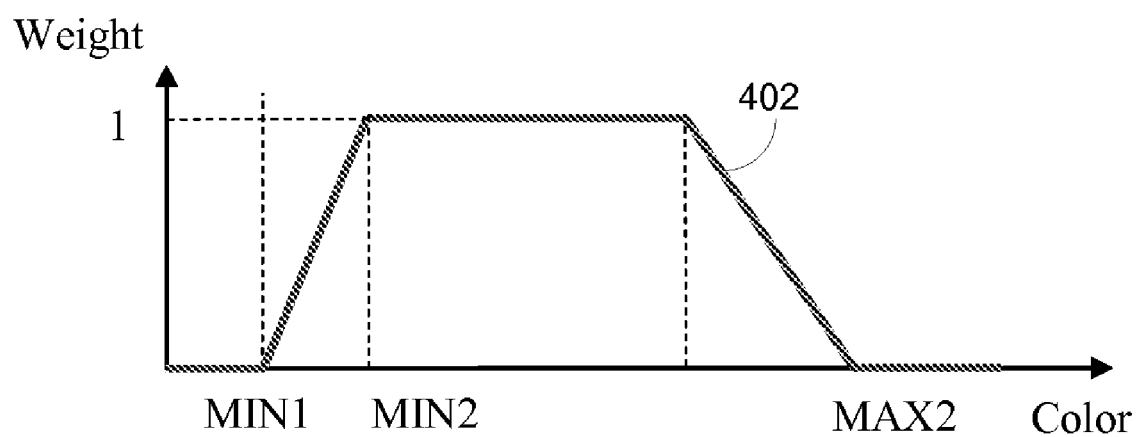
FIG. 5 illustrates a weight function applied during a filtered gray estimation process, according to an embodiment of the invention.

Filtered gray world estimation (box 235) includes calculating candidates by filtering pixels according to their brightness. Conveniently, very high intensity and very low intensity pixels are ignored. FIG. 5 illustrates a weight (illustrated by graph 402) assigned to a color element of a pixel. As single pixel can include multiple color elements, one out of these weights (for example, the minimum weight out of a green color weight, a red color weight and a blue color weight can be selected). A weighted sum of the pixels of an area provides a candidate of a certain pixel area. Candidates that are positioned within the gray polygon or, optionally, outside the gray polygon but proximate to the gray polygon, are processed to provide a digital image imbalance estimation.

Figure 6:
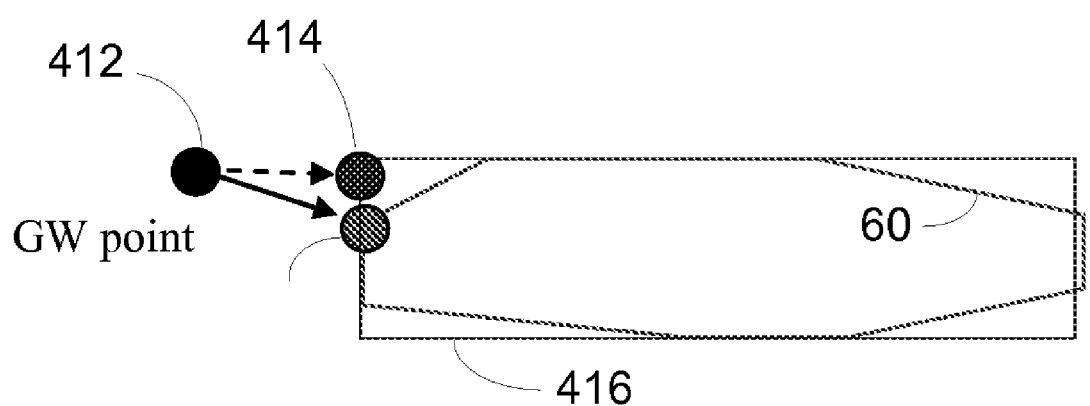
FIG. 6 illustrates a limiting gray estimation process, according to an embodiment of the invention.

Limited gray world estimation (box 236) includes calculating a gray digital image imbalance estimation by applying a gray world estimation. If the digital image imbalance estimation falls outside the gray polygon then it is replaced by the closets point of the gray polygon. This is illustrated by FIG. 6 in which digital image imbalance estimation 412 falls outside gray polygon 60 and is replaced by point 416 on gray polygon 60.

The multiple gamut filtering white balance estimation process can be a multiple illumination condition gamut filtering white balancing estimation process (box 532) or a multiple color gamut filtering white balancing estimation process (box 533). Conveniently both processes are applied during stage 530.

It is noted that at least some of the mentioned above white balancing estimation processes can be responsive to various inputs or can be augmented to take into account a larger group of candidates.

For example, at least one of the following stages can be integrated within the abovementioned white balancing estimation processes: (i) taking into account candidates (so called relevant candidates) having chromaticity value pairs that are located inside a color gamut and candidates having chromaticity values located outside a color gamut but proximate to the color gamut; (ii) receiving, from a source (such as an auto exposure unit) that differs from a processor that calculates at least one white balancing compensation parameter, an illumination estimation and applying the multiple white balancing estimation processes in response to the illumination estimation.

Stage 530 is followed by stage 540 of calculating at least one white balancing compensation parameter in response to at least two digital image imbalance estimations.

Conveniently, stage 540 includes: (i) calculating a digital image imbalance result that is responsive to two or more digital image imbalance estimations that were calculated during stage 540; and (iii) calculating one or more white balancing compensation parameter in response to the digital image imbalance result.

The calculation of the digital image imbalance result can be responsive to various factors such as the reliability of each digital image imbalance estimation or the inherent reliability of each white balancing estimation process.

The reliability can be reflect an inherent white balancing estimation process reliability and can reflect a number of candidates that represent pixel areas and have relevant chromaticity value pairs. Typically, if more candidates are deemed to be relevant to a certain white balancing estimation process then the reliability of that digital image imbalance estimation is higher.

The inherent reliability of a certain white balancing estimation process can be measured during a calibration process, especially by comparing images of known objects (of known colors), under different illumination conditions, applying the certain white balancing estimation process and evaluating whether the outcome reflects the expected digital image.

The inherent reliability of the white balancing estimation process can be determined or updated during multiple iterations of method 500.

It is noted that stage 540 can include ignoring low reliability (below threshold) digital image imbalance estimations.

The difference between the digital image imbalance result and a target (for example a target that has equal R, G and B values) should be compensated by at least one white balance compensation parameter. For example, assuming that each of the target and the digital image imbalance results have a pair of chromaticity values then the difference between these pairs should be compensated by applying a Red color gain, a Blue color gain, and a Green color gain.

Figure 18:
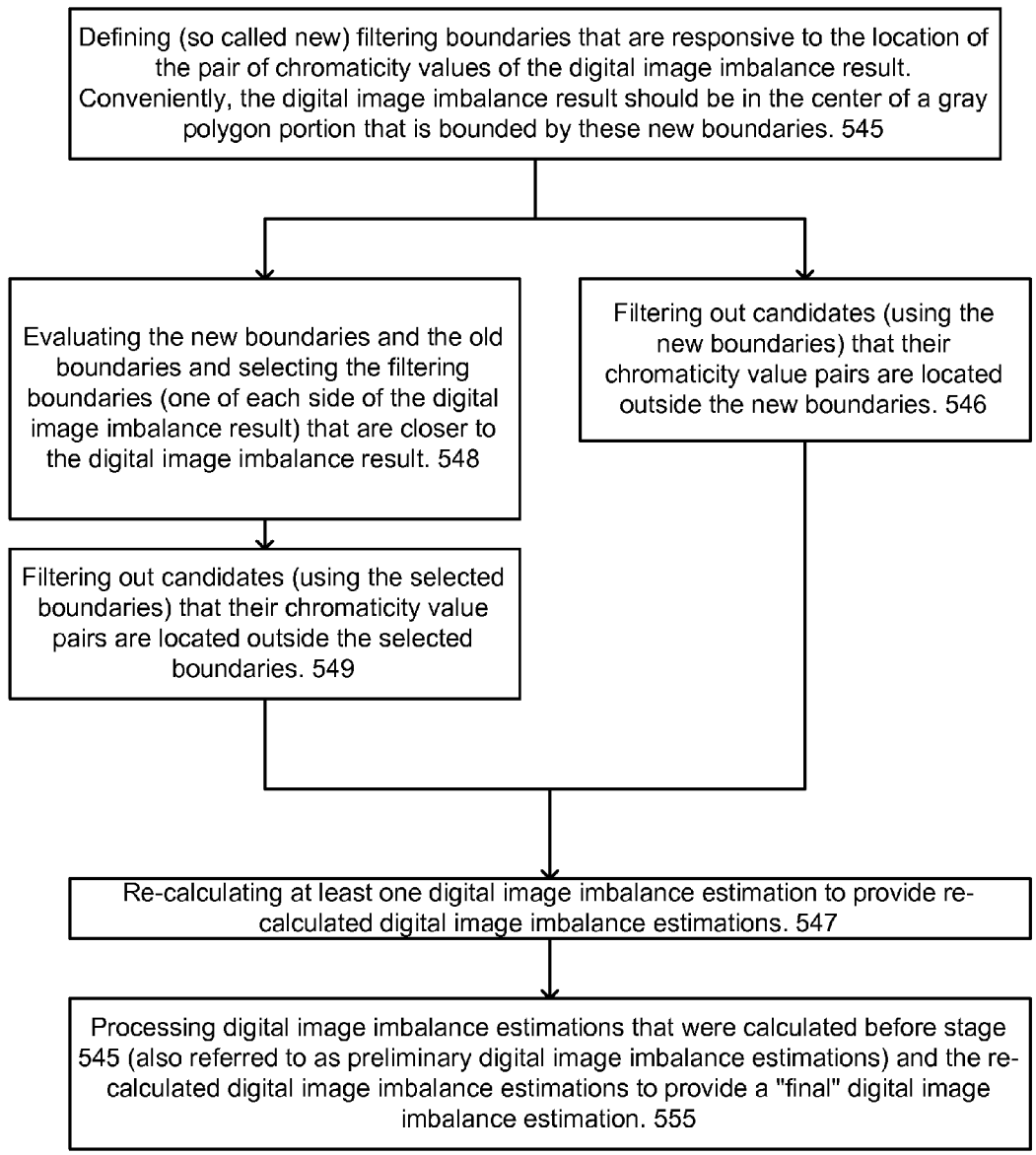
FIG. 18 is a flow chart of a method according to an embodiment of the invention.

According to an embodiment of the invention the pair of chromaticity values of the digital image imbalance result can be used to fine tune the digital image imbalance estimations, as illustrated by method 544 of FIG. 18.

Method 544 can include stages 545, 546 and 547.

Stage 545 includes defining (so called new) filtering boundaries that are responsive to the location of the pair of chromaticity values of the digital image imbalance result. Conveniently, the digital image imbalance result should be in the center of a gray polygon portion that is bounded by these new boundaries.

Stage 545 is followed by stage 546 of filtering out candidates (using the new boundaries) that their chromaticity value pairs are located outside the new boundaries. Stage 546 is followed by stage 547 of re-calculating at least one digital image imbalance estimation to provide re-calculated digital image imbalance estimations.

These filtering boundaries can be used to filter candidates when applying various white balancing estimation processes such as gray world estimation, limited gray world estimation, filtered gray world estimation, or a multiple gamut filtering white balance estimation process.

Yet according to another embodiment of the invention, additional filtering boundaries are taken into account. These filtering boundaries (so called old boundaries) were utilized when applying various white balancing estimation processes such as a multiple gamut filtering white balance estimation process.

This additional embodiment is illustrated by stage 548 that replaces stage 546. Stage 548 includes evaluating the new boundaries and the old boundaries and selecting the filtering boundaries (one of each side of the digital image imbalance result) that are closer to the digital image imbalance result.

Stage 548 is followed by stage 549 of filtering out candidates (using the selected boundaries) that their chromaticity value pairs are located outside the selected boundaries. Stage 549 is followed by stage 547.

Figure 16:
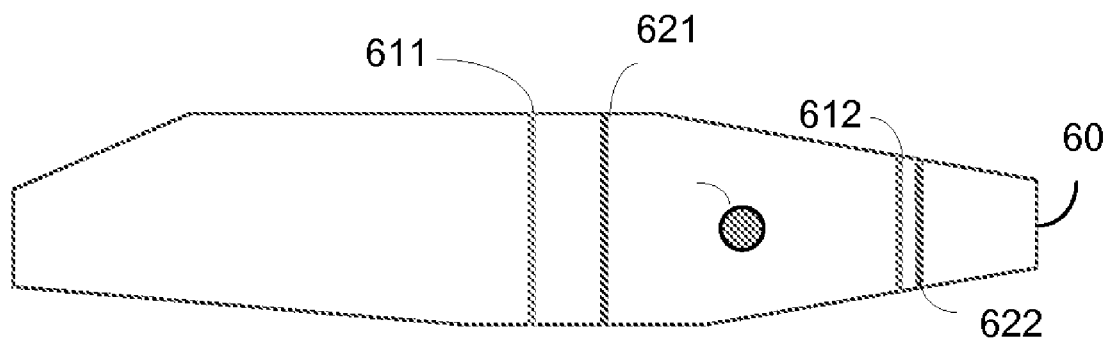
FIG. 16 illustrates digital image imbalance result, new boundaries and old boundaries according to an embodiment of the invention.

FIG. 16 illustrates digital image imbalance result 602, new boundaries 611 and 612 and old boundaries 621 and 622. Boundaries 621 and 612 are closer to digital image imbalance result 602 and thus are selected as filtering boundaries.

According to an embodiment of the invention stage 547 can be followed by stage 555 of processing digital image imbalance estimations that were calculated before stage 545 (also referred to as preliminary digital image imbalance estimations) and the re-calculated digital image imbalance estimations provide a "final" digital image imbalance estimation.

The processing can involve calculating a weighted sum of at least one preliminary digital image imbalance estimation and at least one corresponding (calculated by the same white balancing estimation process) re-calculated digital image imbalance estimation. The weights assigned to the re-calculated digital image imbalance estimation can be responsive to an illumination condition distinctiveness of a preliminary digital image imbalance estimation.

Figure 17:
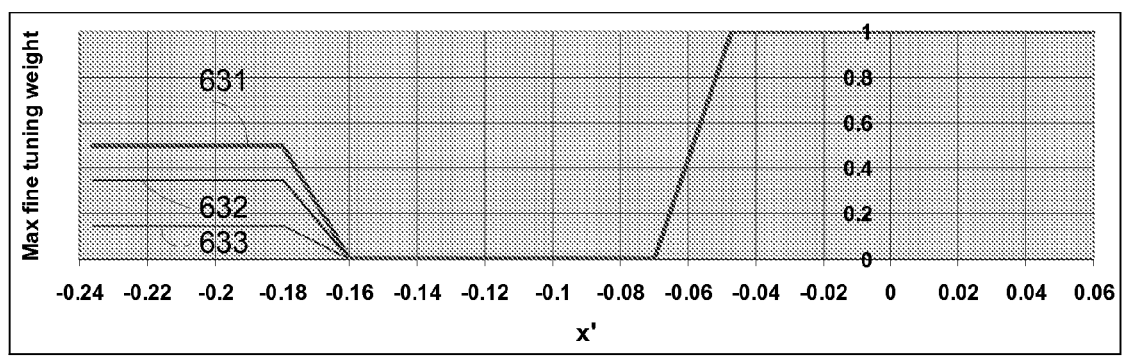
FIG. 17 illustrates weights assigned to re-calculated digital image imbalance estimation that depends upon the illumination condition according to an embodiment of the invention.

FIG. 17 illustrates weights assigned to re-calculated digital image imbalance estimation that depends upon the illumination condition. If the illumination condition is not determined during a previous white balancing estimation process then the re-calculated digital image imbalance estimation can be assigned a very low weight. Daylight illumination can result in higher weights. Graphs 632, 634 and 636 illustrate the weights assigned to re-calculated digital image imbalance estimations under different illumination conditions, and the dependency between the weight and the chromaticity value X' of the re-calculated digital image imbalance estimation.

Stage 540 is followed by stage 550 of providing a compensated digital image by applying at least one white balancing compensation parameter.

Figure 15:
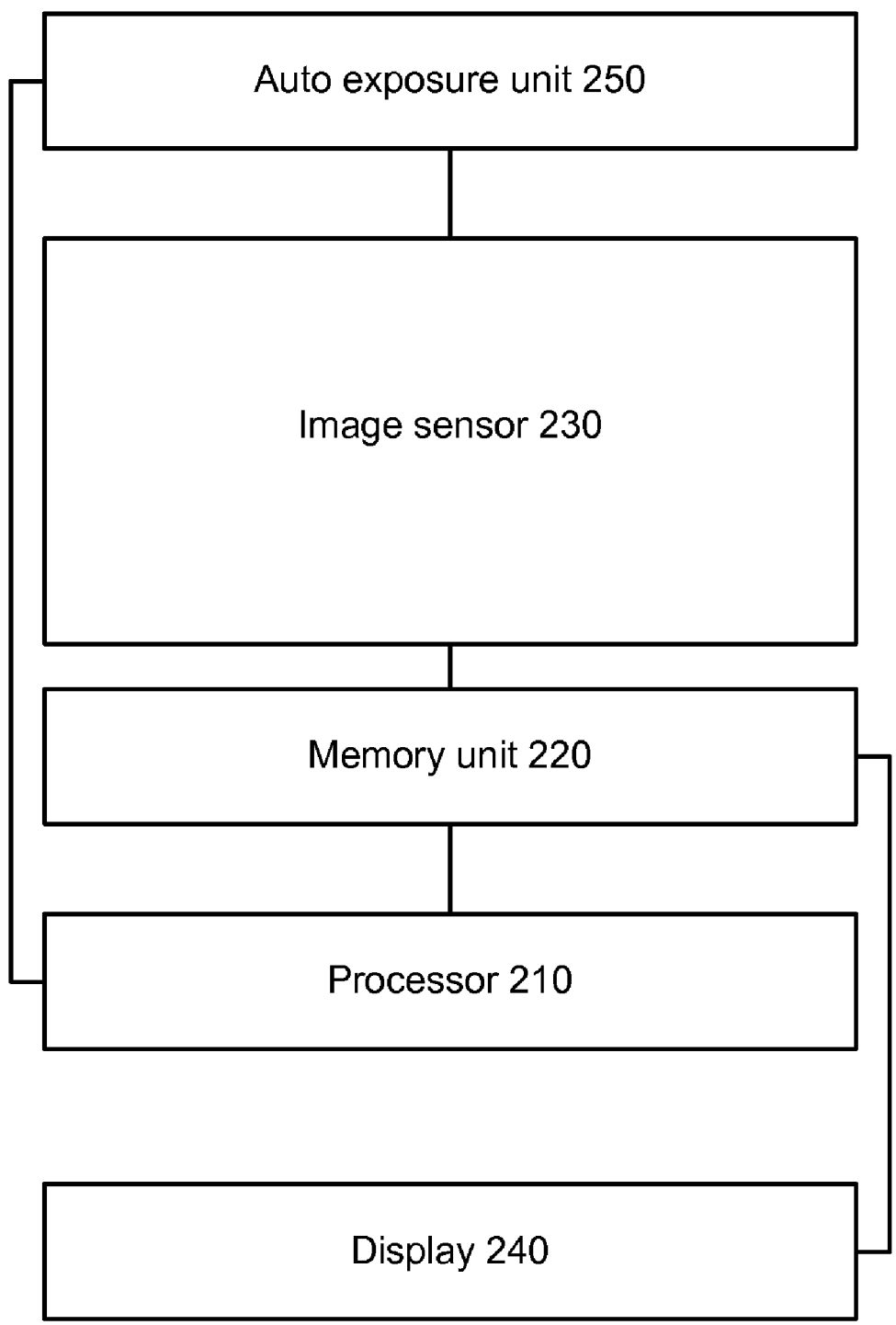
FIG. 15 illustrates a device according to an embodiment of the invention.

FIG. 15 illustrates device 200 according to an embodiment of the invention.

Device 200 has color gamut based white balancing capabilities. Device 200 includes processor 210 and memory unit 220.

FIG. 15 illustrates device 200 that is a camera and also includes image sensor 230, display 240, and auto exposure unit 250.

It is noted that device 200 can differ from a camera and can be, for example, a stand alone computer that receives images that are acquired by other devices, and generate a white balance compensated image. These white balance compensated image can be stored in device 200, can be displayed by device, and/or can be transmitted from device to another device, memory unit, or display.

Referring to FIG. 15, image sensor 230 acquires a digital image that is sent to memory unit 220. Processor 210 can process the digital image to provide a white balance compensated image. This white balance compensated image can be stored in memory unit 220, and/or displayed on display 240.

Auto exposure unit 250 can estimate an illumination condition, and this estimate can assist in the image acquisition process and even at the while balancing process. For example, this estimation can be used in the selection of selected candidates (filter out candidates that are located in color gamut portions of other illumination conditions), and when different color candidates are averaged to provide a preliminary digital image imbalance estimation.

Memory unit 220 stores the digital picture and can also store mapping coefficient, chromaticity value pairs, color gamut information, at least one white balance compensation parameter, and a white balance compensated image.

Processor 210 can execute various stages of method 100, method 300, method 500 of a combination of any stages of these methods.

For example, it can (when executing a code): generate or receiving multiple candidates, each candidate represents a pixel area of the digital image; apply multiple white balancing estimation processes on the candidates to provide multiple digital image imbalance estimations; wherein a first white balancing estimation process differs from a second white balancing estimation process by its inherent reliability; calculate at least one white balancing compensation parameter in response to at least two digital image imbalance estimations; and provide a compensated digital image by applying at least one white balancing compensation image.

It is noted that a computer program product can be provided. It includes a tangible computer readable medium that stores code that once executed by a computer (such as processor 210 of device 200) causes the computer to: generate or receive multiple candidates, each candidate represents a pixel area of the digital image; apply multiple white balancing estimation processes on the candidates to provide multiple digital image imbalance estimations; wherein a first white balancing estimation process differs from a second white balancing estimation process by its inherent reliability; calculate at least one white balancing compensation parameter in response to at least two digital image imbalance estimations; and provide a compensated digital image by applying at least one white balancing compensation image.

The code can cause the computer to execute any stage of method out of methods 100, 300, 500 or a combination thereof.

Multiple Color Gamut Filtering White Balancing Estimation Process

This process utilized multiple color gamuts.

These color gamuts can include gray gamut and at least one non-gray gamut. For example, three different color gamuts, five different color gamuts and even more color gamuts can be used. The non-gray colors can be selected in various manners. For example, a combination of blue gamut, green gamut, skin tone gamut, and gray gamut can be used.

Multiple areas of digital pixels are represented by candidates that have a pair of chromaticity values that are calculated from color information of these areas of pixels. A selection process selects candidates that have chromaticity values that are located within any of these color gamuts.

A candidate is an information unit that represents color information of a pixel area. It has a pair of chromaticity values. It is termed candidate because is can affect the white balancing process or can be ignored.

After the selection process ends, at least one white balance compensation parameter is calculated in response to selected candidates.

At least one white balance compensation parameter can be used to provide a compensated digital image.

By using multiple color gamuts of different colors the number of candidates (and hence pixel areas) that are taken into account increases.

Candidates that have their chromaticity values in proximity to a color gamut but outside the color gamut can also be taken into account—resulting in a further increment of the number of "relevant" candidates.

Furthermore, by utilizing multiple color gamuts of different colors the white balancing process is less sensitive to that color which is dominant in the digital image.

The white balancing is simplified by processing chromaticity values of candidates, especially when the number of the candidates is much smaller than the number of pixels of the digital image.

Conveniently, the white balancing is further simplified generating chromaticity values within a chromaticity space in which a black body line is horizontal.

Figure 9:
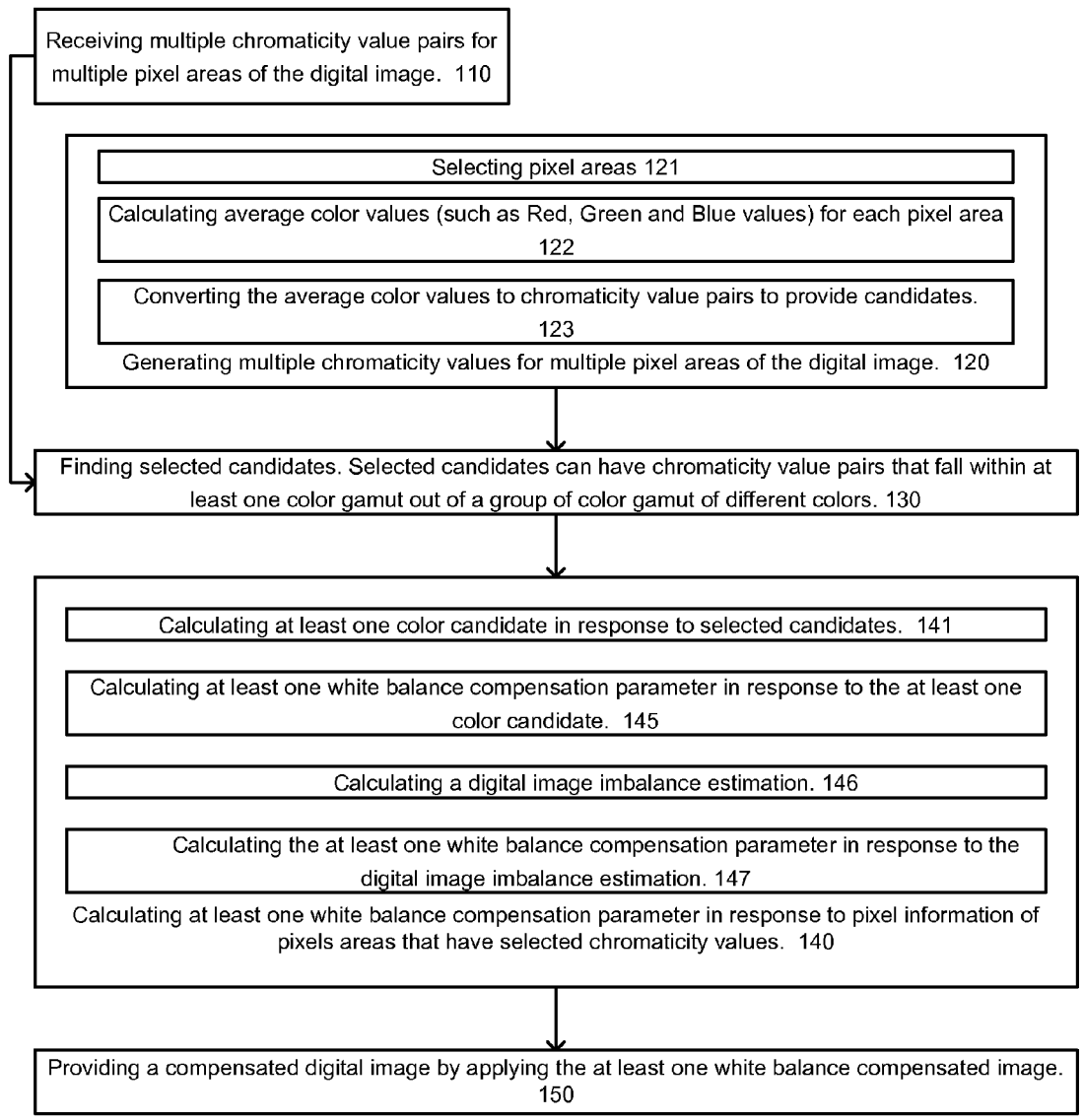
FIG. 9 is a flow chart of a method according to an embodiment of the invention.

FIG. 9 illustrates method 100 according to an embodiment of the invention.

Method 100 starts by stage 110 or 120.

Stage 110 includes receiving multiple chromaticity value pairs for multiple pixel areas of the digital image. Stage 110 includes receiving multiple candidates.

Stage 120 includes generating multiple chromaticity values for multiple pixel areas of the digital image. Stage 120 includes generating candidates.

Stage 120 can include at least one of the following stages or a combination thereof: (i) stage 121 of selecting pixel areas; (ii) stage 122 of calculating average color values (such as Red, Green and Blue values) for each pixel area; and (iii) stage 123 of converting the average color values to chromaticity value pairs to provide candidates. The chromaticity values of the candidates can be within a chromaticity space in which a black body line is horizontal but this is not necessarily so.

Referring back to FIG. 9, stages 110 and 120 are followed by stage 130 of finding selected candidates. According to an embodiment of the invention, selected candidates have chromaticity value pairs that fall within at least one color gamut out of a group of color gamut of different colors.

These different colors can include at least one of the following: (i) gray and at least one color that differs from gray; (ii) gray and at least two colors that differs from gray; (iii) gray and at least two colors out of skin tone, green and sky-blue; or (iv) multiple colors that differ from gray.

Figure 7:
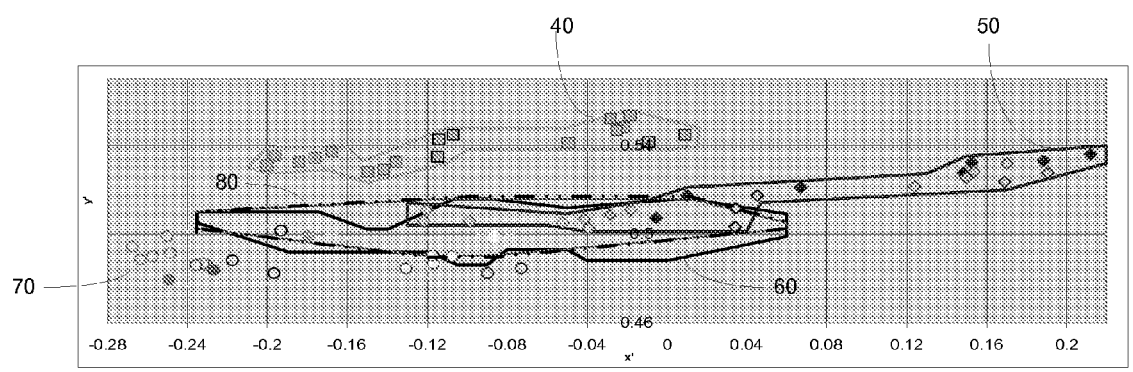
FIG. 7 illustrates five color gamuts and multiple candidates according to an embodiment of the invention.

FIG. 7 illustrates four color gamuts—green gamut 40, blue gamut 50, gray gamut 60, yellow gamut 70, and skin tone gamut 80 according to an embodiment of the invention. FIG. 7 also illustrates multiple candidates. These gamuts can be generated by illuminating a Macbeth chart by different illumination conditions, during a calibration process, and determining the X' and Y' chromaticity ranges of each color.

According to another embodiment of the invention, selected candidates can also have chromaticity value pairs that fall outside a color gamut (out of color gamuts 40, 50, 60, 70 and 80) but are proximate to the color gamut. Conveniently, the weight assigned to such candidates are different (usually lower) than the weight assigned to candidates that their chromaticity value pairs fall within the color gamut. A weight can be inversely proportional to the distance between the color gamut and the candidate but this is not necessarily so. For example, the weight can be a non-linear function of that distance, or can be a function that is not responsive to that distance. These weights are taken into account when a color candidate is calculated.

Referring back to FIG. 9, stage 130 is followed by stage 140 of calculating at least one white balance compensation parameter in response to pixel information of pixels areas that have selected chromaticity values.

Stage 140 can include stages 141 and stage 145. Stage 141 is followed by stage 145.

Stage 141 includes calculating at least one color candidate in response to selected candidates.

Stage 141 can include calculating a color candidate for each color gamut or calculating a single color candidate that is responsive to selected candidates of different color gamuts.

A color candidate of a certain color gamut can be a weighted sum of the chromaticity value pairs of the selected candidates that their chromaticity value pair fall inside the color gamut and optionally also of selected candidates that their chromaticity value pair fall outside the color gamut but in proximity to the color gamut.

Figure 10:
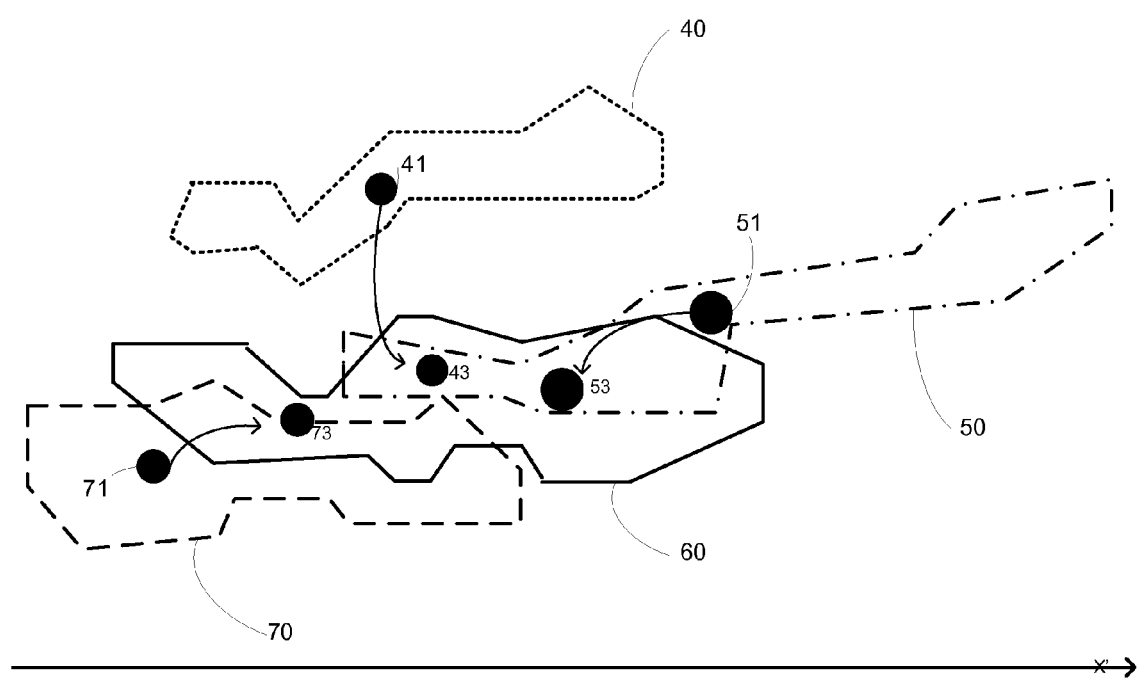
FIG. 10 illustrates multiple color gamuts and various color candidates, according to an embodiment of the invention.

Referring to FIG. 7, up to five color candidates can be calculated—a green candidate, a blue candidate, a gray candidate, a yellow candidate, and a skin tone candidate. Referring to FIG. 10, yellow candidate 71, blue candidate 51, and green candidate 41 are calculated.

Stage 145 includes calculating at least one white balance compensation parameter in response to at least one color candidate.

Stage 145 can include stages 146 and 147.

Stage 146 includes calculating a digital image imbalance estimation.

Assuming that there are multiple color candidates then the digital image imbalance estimation can be a weighted sum of the different color candidates.

Stage 146 can include mapping all non-gray candidates towards the vicinity of the gray gamut to provide multiple mapped candidates. Referring to the example set forth in FIG. 10, yellow candidate 71 is mapped to mapped yellow candidate 73, blue candidate 51 is mapped to mapped blue candidate 53, and green candidate 41 is mapped to mapped green candidate 43.

The mapping can involve applying a mapping function between each color gamut to the gray gamut.

The mapping function can be a bi-linear mapping function having coefficients (a1, b1, c1, a2, b2, and c2) that are determined in advance (for example, during a calibration stage). An example of such a function is illustrated below:

$$x'_{gray}=a_1 x'_{color}+b_1 y'_{color}+c_1$$

$$y'_{gray}=a_2 x'_{color}+b_2 y'_{color}+c_2$$

It is noted that other mapping functions (including non-linear mapping functions, higher power mapping functions and the like) can be used and that the mapping functions can be updated in response to the results of the mapping of stage 126.

The mapping can result in having mapped candidates within the gray gamut or outside the gray gamut. The weight assigned to each mapped candidates can be responsive to one or more parameters such as their location (inside the gray gamut, outside the gray gamut, outside the gray gamut but in proximity to the gray gamut), to the number of candidates associated with each color gamut, to the illumination, and the like.

The illumination can be estimated in various manners, including by looking at selected candidates of one or more colors, and especially looking at extreme candidates and estimating the illumination based upon the location of the extreme candidates.

Conveniently, the illumination is found by performing an average (conveniently a non-weighted average) of the different color candidates to provide a preliminary digital image imbalance estimation, and based upon the chromaticity value X' of that preliminary digital image imbalance estimation selecting the weights to be assigned to each color candidate.

Figure 8:
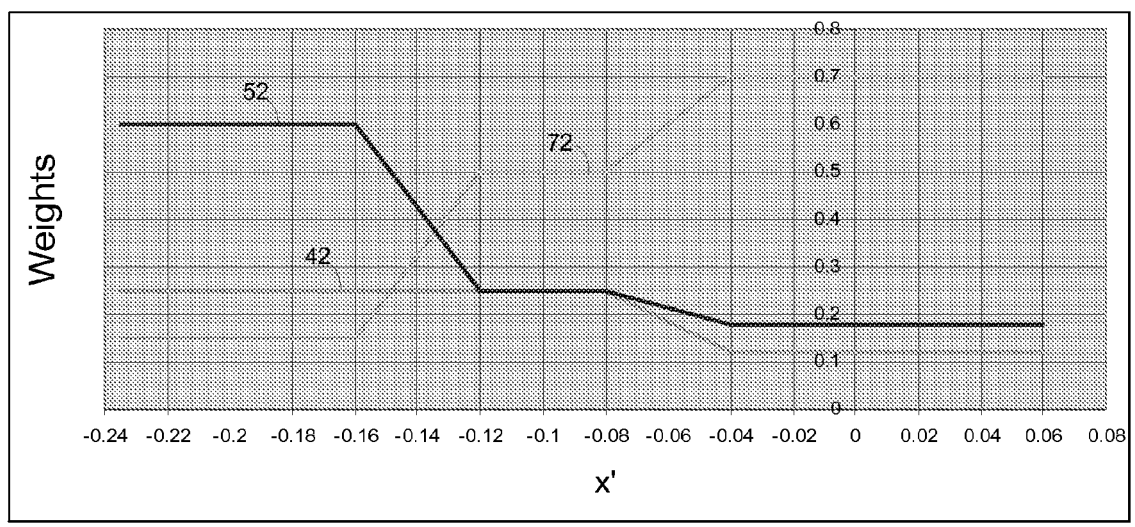
FIG. 8 illustrates different weights assigned to a green mapped candidate, to a yellow mapped candidate, and to a blue mapped candidate, according to an embodiment of the invention.

FIG. 8 illustrates different weights assigned to a green mapped candidate (graph 42) to a yellow mapped candidate (graph 72) and to a blue mapped candidate (graph 52), according to an embodiment of the invention. The weights are responsive to an X' value of the preliminary digital image imbalance estimation. The x-axis is a weight while the x-axis is the X' value.

A (non-preliminary) digital image imbalance estimation is the weighted sum of the different color mapped candidates.

Stage 147 includes calculating at least one white balance compensation parameter in response to the digital image imbalance estimation. The difference between the digital imbalance estimation and a target (for example, a target that has equal R, G and B values) should be compensated by at least one white balance compensation parameter. For example, assuming that each of the target and the digital image imbalance estimations have a pair of chromaticity values, then the difference between these pairs should be compensated by applying a Red color gain, a Blue color gain, and a Green color gain.

Stage 140 is followed by stage 150 of providing a compensated digital image by applying at least one white balance compensated parameter.

FIG. 15 illustrates device 200 according to an embodiment of the invention.

Device 200 has color gamut based white balancing capabilities. Device 200 includes processor 210 and memory unit 220.

FIG. 15 illustrates device 200 that is a camera and also includes image sensor 230, display 240, and auto exposure unit 250.

It is noted that device 200 can differ from a camera and can be, for example, a stand alone computer that receives images that are acquired by other devices, and generate a white balance compensated image. These white balance compensated images can be stored in device 200, can be displayed by device, and/or can be transmitted from device to another device, memory unit, or display.

Referring to FIG. 15, image sensor 230 acquires a digital image that is sent to memory unit 220. Processor 210 can process the digital image to provide a white balance compensated image. This white balance compensated image can be stores in memory unit 220, and/or displayed on display 240.

Auto exposure unit 250 can estimate an illumination condition, and this estimate can assist in the image acquisition process and even at the while balancing process. For example, this estimation can use in the selection of selected candidates (filter out candidates that are located in color gamut portions of other illumination conditions), and when different color candidates are averaged to provide a preliminary digital image imbalance estimation.

Memory unit 220 stores the digital picture and can also store mapping coefficient, chromaticity value pairs, color gamut information, at least one white balance compensation parameter, and a white balance compensated image.

Processor 210 can execute various stages of method 100. For example, it can (when executing a code), to: (i) generate or receive multiple chromaticity value pairs of multiple pixel areas of the digital image; (ii) find selected candidates; wherein a selected candidate represents a pixel area and has a chromaticity value pair that falls within at least one color gamut out of a group of color gamut of different colors; wherein the different colors comprise at least one color that differs from gray; (iii) calculate at least one white balance compensation parameter in response to pixel information of pixels areas that have selected chromaticity values; and (iv) provide a white balance compensated image.

It is noted that a computer program product can be provided. It includes a tangible computer readable medium that stores code that once executed by a computer (such as processor 210 of device 200) causes the computer to: (i) generate or receive multiple chromaticity value pairs of multiple pixel areas of the digital image; (ii) find selected candidates; wherein a selected candidate represents a pixel area and has a chromaticity value pair that falls within at least one color gamut out of a group of color gamut of different colors; wherein the different colors comprise at least one color that differs from gray; (iii) calculate at least one white balance compensation parameter in response to pixel information of pixels areas that have selected chromaticity values; and (iv) provide a compensated digital image by applying at least one white balance compensated image.

Multiple Illumination Condition Gamut Filtering White Balancing Estimation Process Multiple areas of digital pixels are represented by candidates that have a pair of chromaticity values that are calculated from the color information of these areas of pixels. A selection process selects candidates that have chromaticity values that are located within any of these color gamuts.

A candidate is an information unit that represents color information of a pixel area. It has a pair of chromaticity values. It is termed candidate because it can affect the white balancing process or can be ignored.

After the selection process ends, at least one white balance compensation parameter is calculated in response to selected candidates.

At least one white balance compensation parameter can be used to provide a compensated digital image.

Candidates that have their chromaticity values in proximity to a color gamut but outside the color gamut can also be taken into account—resulting in a further increment of the number of "relevant" candidates.

The white balancing is simplified by processing chromaticity values of candidates, especially when the number of the candidates is much smaller than the number of pixels of the digital image.

Conveniently, the white balancing is further simplified by generating chromaticity values within a linear chromaticity space in which a black body line is horizontal.

Figure 14:
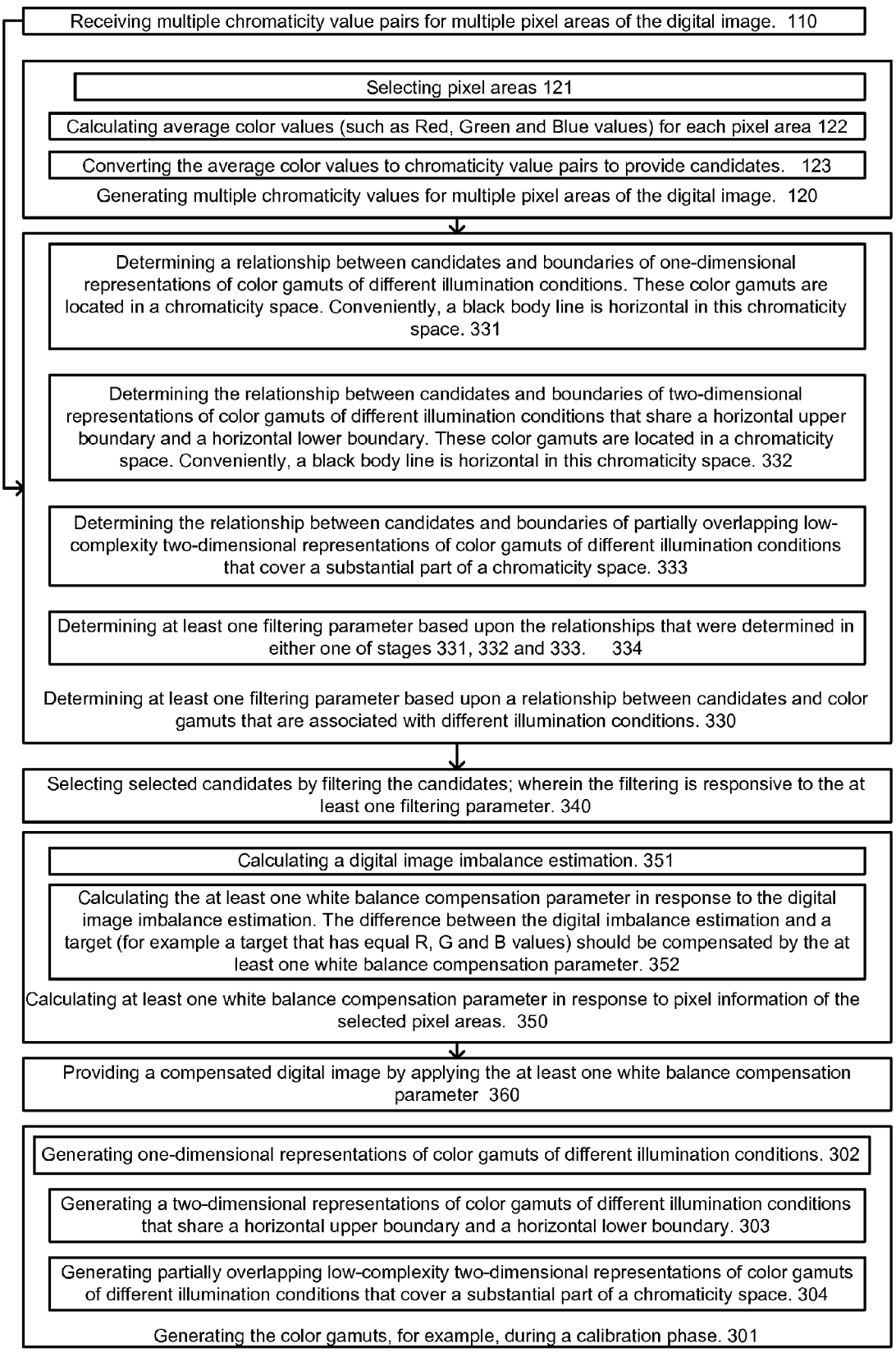
FIG. 14 is a flow chart of a method according to an embodiment of the invention.

FIG. 14 illustrates method 300 according to an embodiment of the invention.

Method 300 starts by stage 110 or 120.

Stage 110 includes receiving multiple chromaticity value pairs for multiple pixel areas of the digital image. Stage 110 includes receiving multiple candidates.

Stage 120 includes generating multiple chromaticity values for multiple pixel areas of the digital image. Stage 120 includes generating candidates.

Stage 120 can include at least one of the following stages or a combination thereof: (i) stage 121 of selecting pixel areas; (ii) stage 122 of calculating average color values (such as Red, Green and Blue values) for each pixel area; and (iii)

stage 123 of converting the average color values to chromaticity value pairs to provide candidates. The chromaticity values of the candidates can be within a chromaticity space in which a black body line is horizontal but this is not necessarily so.

Referring back to FIG. 14, stages 110 and 120 are followed by stage 330 of determining at least one filtering parameter based upon a relationship between candidates and color gamuts that are associated with different illumination conditions.

Stage 330 can include at least one stage out of stages 331, 332, 333 or 334 or a combination thereof.

Stage 331 includes determining a relationship between candidates and boundaries of one-dimensional representations of color gamuts of different illumination conditions. These color gamuts are located in a chromaticity space. Conveniently, a black body line is horizontal in this chromaticity space.

Stage 332 includes determining the relationship between candidates and boundaries of two-dimensional representations of color gamuts of different illumination conditions that share a horizontal upper boundary and a horizontal lower boundary. These color gamuts are located in a chromaticity space. Conveniently, a black body line is horizontal in this chromaticity space.

Stage 333 includes determining the relationship between candidates and boundaries of partially overlapping low-complexity two-dimensional representations of color gamuts of different illumination conditions that cover a substantial part of a chromaticity space.

Stage 334 includes determining at least one filtering parameter based upon the relationships that were determined in stage 330.

These illumination conditions can be determined by one or more outmost candidates—candidates that have the highest absolute value of X'. For example, a pair of outmost candidates can determine the illumination (for example, a right outmost candidate and a left outmost candidate). Yet for another example multiple pair of outmost and almost outmost candidates can determine the illumination condition.

The filtering parameters can be the boundaries of a portion of a gray polygon. A more detailed explanation of these boundaries is provided in relation to stage 340.

Figure 13:
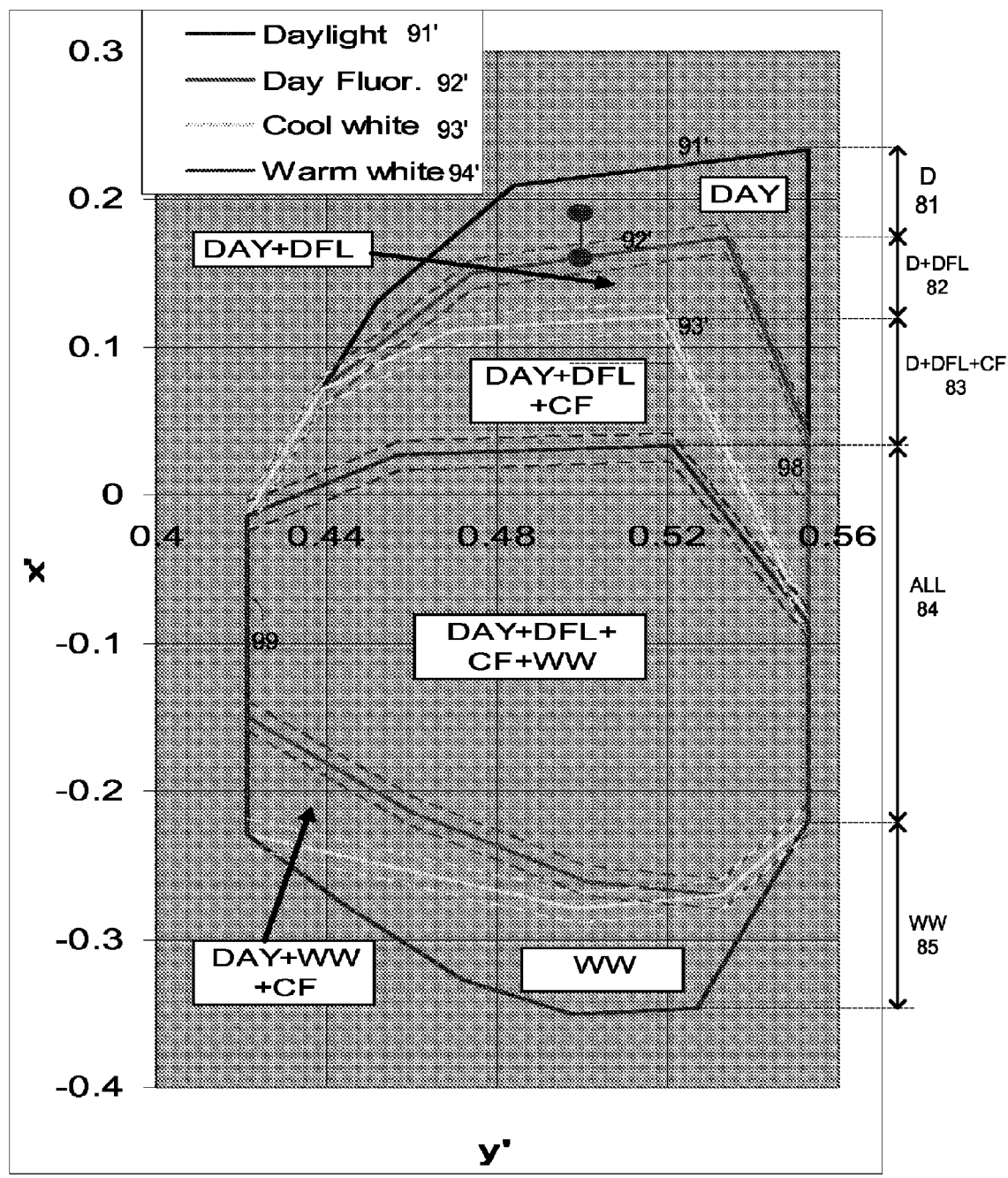
FIG. 13 illustrates a one-dimensional representation of color gamuts of different illumination conditions, and low complexity two dimensional color gamuts according to an embodiment of the invention.

FIG. 13 illustrates a one-dimensional representation of color gamuts of different illumination conditions, and low complexity two dimensional color gamuts according to an embodiment of the invention.

The one-dimensional representation includes multiple sections—section D 81 represents daylight illumination, section D+DFL 82 represent daylight illumination and day fluorescent illumination, section D+DFL+CF 83 represents daylight illumination, day fluorescent illumination and cool white illumination, section ALL 84 represents all illumination conditions, section WW 85 illustrates warm white illumination condition.

It is noted that the transition between one section to another can be smooth—thus the boundaries of these sections define small overlap areas. For example, sections D 81 and D+DFL 82 share an overlap portion and each candidate within this overlap portion is considered as a daylight candidate and as a daylight and day fluorescent candidate.

The low complexity two dimensional color gamuts include: daylight color gamut 91', day fluorescent color gamut 92', cool white color gamut 93' and warm light color gamut 94'. These color gamuts are relatively large and they cover most of the chromaticity space—thus allowing performing white balancing based upon large number of candidates. These color gamuts are partially overlapping and reflect real image acquisition in which a chromaticity value pair of a pixel area can be attributed to a color (or colors) of an illuminated object and to the illumination condition.

These color gamuts are characterized by low complexity and it is very easy to determine whether a candidate is relevant to a certain color gamut or not. A candidate is relevant if it falls inside a color gamut or alternatively if it falls outside the color gamut but is proximate to it. All color gamuts have horizontal upper boundaries that overlap each other. All color gamuts have horizontal lower boundaries that overlap each other. It is noted that for simplicity of explanation, FIG. 13 is tilted by 90 degrees and the x-axis is vertical. It is noted that the mentioned above upper and lower boundaries are substantially parallel to the X' axis and thus are termed horizontal.

The side boundaries of all color gamuts are convex and most of them include only three lines.

The shape of these color gamuts simplify the calculation of a relationship between a candidate and a color gamut as only few linear equations (of one or two boundaries of the color gamut) should be calculated at most in order to determine the spatial relationship between the candidate and the color gamut.

Stage 330 is followed by stage 340 of selecting selected candidates by filtering the candidates. The filtering is responsive to at least one filtering parameter.

Figure 12:
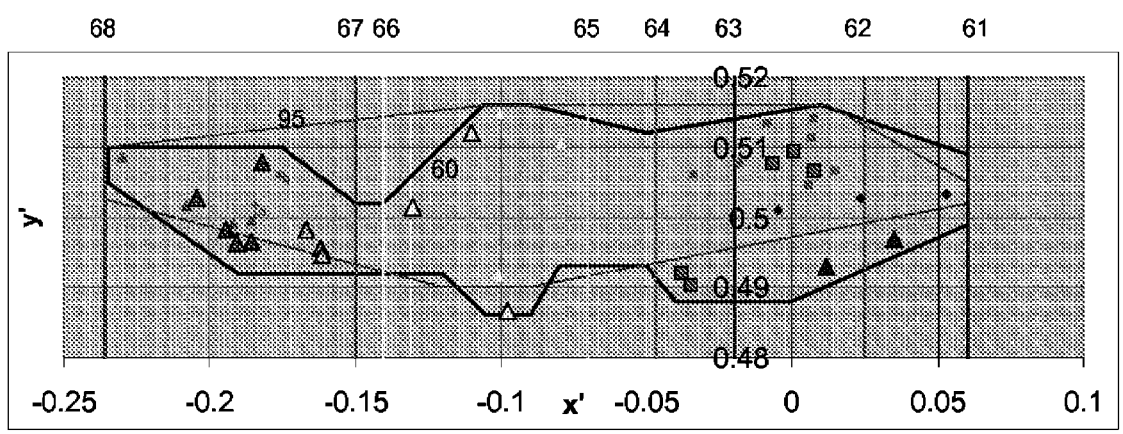
FIG. 12 illustrates a gray polygon and multiple portions of the gray polygon, according to an embodiment of the invention.

As indicated above, the filtering parameters can be the boundaries of a portion of a gray polygon. Each portion is associated with an illumination condition. FIG. 12 illustrates gray polygon 60 and multiple boundaries 61-68 such as daylight illumination boundaries 61 and 63, day fluorescent illumination boundaries 62 and 64, cool white illumination boundaries 65 and 67 and warm white illumination boundaries 66 and 68. These boundaries define overlapping portions.

After an illumination condition is defined—typically in response to locations of candidates—the gray polygon portion that corresponds to that illumination condition is selected. Thus, other candidates are filtered out. It is noted that candidates that are outside the boundaries of the selected portion but proximate to the boundary can also be regarded as selected candidates. The candidates can receive weights that reflect their location in relation to the selected portion.

Stage 340 is followed by stage 350 of calculating at least one white balance compensation parameter in response to pixel information of the selected pixel areas.

Chromaticity values (or other format of color information) of the selected candidates can be processed in order to provide at least one white balance compensation parameter.

Stage 350 can include stage 351 and 352.

Stage 351 includes calculating a digital image imbalance estimation. It can be responsive to chromaticity values (or other format of color information) of the selected candidates. It can be, for example, a weighted average but this is not necessarily so. Various statistical processes can be applied during stage 351.

It is noted that selected candidates can also have chromaticity value pairs that fall outside a selected gray polygon portion but are proximate to the selected gray polygon portion. Conveniently, the weight assigned to such candidates differ (usually lower) than the weight assigned to candidates that their chromaticity value pairs fall within the selected gray polygon portion. A weight can be inversely proportional to the distance between the selected gray polygon portion and the candidate but this is not necessarily so. For example, the weight can be a non-linear function of that distance, or can be a function that is not responsive to that distance. These weights are taken into account during stage 351.

Stage 352 includes calculating at least one white balance compensation parameter in response to the digital image imbalance estimation. The difference between the digital imbalance estimation and a target (for example, a target that has equal R, G and B values) should be compensated by at least one white balance compensation parameter.

Stage 350 is followed by stage 360 of providing a compensated digital image by applying at least one white balance compensated parameter.

Method 300 can include preliminary stage 301 of generating the color gamuts, for example, during a calibration phase.

Stage 301 can include at least one of the following stages: stage 302 of generating one-dimensional representations of color gamuts of different illumination conditions; stage 303 of generating a two-dimensional representations of color gamuts of different illumination conditions that share a horizontal upper boundary and a horizontal lower boundary; and stage 304 of generating partially overlapping low-complexity two-dimensional representations of color gamuts of different illumination conditions that cover a substantial part of a chromaticity space.

FIG. 15 illustrates device 200 according to an embodiment of the invention.

Device 200 has color gamut based white balancing capabilities. Device 200 includes processor 210 and memory unit 220.

FIG. 15 illustrates device 200 that is a camera and also includes image sensor 230, display 240, and auto exposure unit 250.

It is noted that device 200 can differ from a camera and can be, for example, a stand alone computer that receives images that are acquired by other devices, and generate a white balance compensated image. These white balance compensated images can be stored in device 200, can be displayed by device, and/or can be transmitted from device to another device, memory unit, or display.

Referring to FIG. 15, image sensor 230 acquires a digital image that is sent to memory unit 220. Processor 210 can process the digital image to provide a white balance compensated image. This white balance compensated image can be stores in memory unit 220, and/or displayed on display 240.

Auto exposure unit 250 can estimate an illumination condition, and this estimate can assist in the image acquisition process and even at the while balancing process. For example, this estimation can use in the selection of a selected gray polygon portion.

Memory unit 220 stores the digital picture and can also store mapping coefficient, chromaticity value pairs, color gamut information, at least one white balance compensation parameter, and a white balance compensated image.

Processor 210 can execute various stages of method 300. For example, it can (when executing a code): (i) determine at least one filtering parameter based upon a relationship between candidates and color gamuts that are associated with different illumination conditions; wherein each candidate represents a pixel area; (ii) select selected candidates by filtering the candidates; wherein the filtering is responsive to at least one filtering parameter; (iii) calculate at least one white balance compensation parameter in response to pixel information of the selected pixel areas; and (iv) provide a compensated digital image by applying at least one white balance compensated parameter.

It is noted that a computer program product can be provided. It includes a tangible computer readable medium that stores code that once executed by a computer (such as processor 210 of device 200) causes the computer to: (i) determine at least one filtering parameter based upon a relationship between candidates and color gamuts that are associated with different illumination conditions; wherein each candidate represents a pixel area; (ii) select selected candidates by filtering the candidates; wherein the filtering is responsive to at least one filtering parameter; (iii) calculate at least one white balance compensation parameter in response to pixel information of the selected pixel areas; and (iv) provide a compensated digital image by applying at least one white balance compensated parameter.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Although the invention is described herein with reference to specific embodiments, various modifications and changes can be made without departing from the scope of the present invention as set forth in the claims below.

Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

We claim:

1. A method for performing white balancing of a digital image, the method comprises:
generating or receiving by a device having color gamut based white balancing capabilities multiple candidates, each candidate represents a pixel area of the digital image;
applying by a processor of the device multiple white balancing estimation processes on the candidates to provide multiple digital image imbalance estimations; wherein a first white balancing estimation process differs from a second white balancing estimation process by its inherent reliability;

calculating by the processor at least one white balancing compensation parameter in response to at least two digital image imbalance estimations; and providing by the processor a compensated digital image by applying at least one white balancing compensation image.

2. The method according to claim 1 comprising calculating by the processor at least one white balancing compensation parameter in response reliabilities of digital image imbalance estimations; wherein a reliability of a white balancing estimation process reflects an inherent white balancing estimation process reliability and reflects a number of candidates that represent pixel areas and have relevant chromaticity value pairs.

3. The method according to claim 1 comprising applying by the processor at least one white balancing estimation process selected out of a list consisting of gray world estimation, filtered gray world estimation and limited gray world estimation; and applying a multiple gamut filtering white balancing estimation process.

4. The method according to claim 1 wherein relevant candidates comprises candidates having chromaticity value pairs that are located inside a color gamut and candidates having chromaticity values located outside a color gamut but proximate to the color gamut.

5. The method according to claim 1 comprising applying by the processor a gray world estimation, a filtered gray world estimation, a limited gray world estimation and applying a multiple color gamut filtering white balancing estimation process to provide multiple digital image imbalance estimations and calculating at least one white balancing compensation parameter while ignoring low reliability digital image imbalance estimations.

6. The method according to claim 1 comprising applying by the processor at least one white balancing estimation process selected out of a list consisting of gray world estimation, filtered gray world estimation and limited gray world estimation; and applying a multiple illumination condition gamut filtering white balancing estimation process.

7. The method according to claim 1 comprising applying by the processor at least one white balancing estimation process selected out of a list consisting of gray world estimation, filtered gray world estimation and limited gray world estimation; applying a multiple illumination condition gamut filtering white balancing estimation process and applying a multiple color gamut filtering white balancing estimation process.

8. The method according to claim 1 comprising assigning by the processor reliability reflecting weights to different digital image imbalance estimations.

9. The method according to claim 1 comprising determining by the processor an illumination condition in response to at least two gray candidates that have chromaticity value pairs that can be attributed to a gray object; filtering the gray candidates in response to the illumination condition; and applying at least one white balancing estimation process on filtered candidates.

10. The method according to claim 1 comprising selecting by the processor multiple filtering boundaries out of a group of boundaries that comprises gamut based filtering boundaries and digital image imbalance estimation filtering boundaries in response to a proximity of boundaries to a digital image imbalance estimation.

11. The method according to claim 10 comprising calculating by the processor at least one white balancing compensation parameter in response to an illumination condition distinctiveness of a preliminary digital image imbalance estimation.

12. The method according to claim 1 comprising receiving, from a source that differs from the processor an illumination estimation and applying by the processor the multiple white balancing estimation processes in response to the illumination estimation.

13. A device having color gamut based white balancing capabilities, the device comprises a processor and a memory unit;

wherein the memory unit stores the digital picture and multiple candidates, each candidate represents a pixel area of the digital image;

wherein the processor is adapted to:

apply multiple white balancing estimation processes to provide multiple digital image imbalance estimations; wherein a first white balancing estimation process differs from a second white balancing estimation process by its inherent reliability;

calculate at least one white balancing compensation parameter in response to at least two digital image imbalance estimations; and provide a compensated digital image by applying at least one white balancing compensation image.

14. The device according to claim 13 wherein the processor is adapted to calculate at least one white balancing compensation parameter in response reliabilities of digital image imbalance estimations; wherein a reliability of a white balancing estimation process reflects an inherent white balancing estimation process reliability and reflects a number of candidates that represent pixel areas and have relevant chromaticity value pairs.

15. The device according to claim 13 wherein the processor is adapted to apply at least one white balancing estimation process selected out of a list consisting of gray world estimation, filtered gray world estimation and limited gray world estimation; and applying a multiple color gamut filtering white balancing estimation process.

16. The device according to claim 15 wherein relevant candidates comprises candidates having chromaticity value pairs that are located inside a color gamut and candidates having chromaticity values located outside a color gamut but proximate to the color gamut.

17. The device according to claim 13 wherein the processor is adapted to apply at least one white balancing estimation process selected out of a list consisting of gray world estimation, a filtered gray world estimation, a limited gray world estimation and apply a multiple color gamut filtering white balancing estimation process to provide multiple digital image imbalance estimations and calculating at least one white balancing compensation parameter while ignoring low reliability digital image imbalance estimations.

18. The device according to claim 13 wherein the processor is adapted to apply at least one white balancing estimation process selected out of a list consisting of gray world estimation, filtered gray world estimation and limited gray world estimation; and apply a multiple illumination condition gamut filtering white balancing estimation process.

19. The device according to claim 13 wherein the processor is adapted to apply at least one white balancing estimation process selected out of a list consisting of gray world estimation, filtered gray world estimation and limited gray world estimation; applying a multiple illumination condition gamut filtering white balancing estimation process and apply a multiple color gamut filtering white balancing estimation process.

20. The device according to claim 13 wherein the processor is adapted to assign reliability reflecting weights to different digital image imbalance estimations.

21. The device according to claim 13 wherein the processor is adapted to determine an illumination condition in response to at least two gray candidates that have chromaticity value pairs that can be attributed to a gray object; filtering the gray candidates in response to the illumination condition; and apply at least one white balancing estimation process on filtered candidates.

22. The device according to claim 13 wherein the processor is adapted to select multiple filtering boundaries out of a group of boundaries that comprises gamut based filtering boundaries and digital image imbalance estimation filtering boundaries in response to a proximity of boundaries to a digital image imbalance estimation.

23. The device according to claim 13 wherein the processor is adapted to generate digital image imbalance estimation filtering boundaries in response to an illumination condition distinctiveness of a preliminary digital image imbalance estimation.

24. The device according to claim 13 wherein the processor is adapted to receive, from a source that differs from the processor, an illumination estimation and apply the multiple white balancing estimation processes in response to the illumination estimation.

25. A computer program product that comprises a tangible computer readable medium that stores code that once executed by a computer cause the computer to:
generate or receive multiple candidates, each candidate represents a pixel area of the digital image; apply multiple white balancing estimation processes to provide multiple digital image imbalance estimations; wherein a first white balancing estimation process differs from a second white balancing estimation process by its inherent reliability; calculate at least one white balancing compensation parameter in response to at least two digital image imbalance estimations; and provide a compensated digital image by applying at least one white balancing compensation image.

* * * * *